(12) United States Patent
Biskeborn et al.

(10) Patent No.: US 7,883,607 B2
(45) Date of Patent: Feb. 8, 2011

(54) METHODS OF ION MILLING FOR MAGNETIC HEADS AND SYSTEMS FORMED THEREBY

(75) Inventors: Robert Glenn Biskeborn, Hollister, CA (US); Cherngye Hwang, San Jose, CA (US); Calvin Shyhjong Lo, Saratoga, CA (US); Andrew C. Ting, El Prado, NM (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 12/193,834

(22) Filed: Aug. 19, 2008

(65) Prior Publication Data

US 2010/0047628 A1 Feb. 25, 2010

(51) Int. Cl.
C23C 14/34 (2006.01)
(52) U.S. Cl. .................. 204/192.32; 204/192.34; 204/192.35
(58) Field of Classification Search ............ 204/192.32, 204/192.34, 192.35
See application file for complete search history.

(56) References Cited

U.S. PATENT DOCUMENTS

| | | | |
|---|---|---|---|
| 5,350,499 A | 9/1994 | Shibaike et al. | 204/192.34 |
| 5,761,790 A | 6/1998 | Carr et al. | 29/603.15 |
| 6,264,787 B1 | 7/2001 | Burbank | 156/345 |
| 6,423,240 B1 * | 7/2002 | Wang et al. | 216/22 |
| 6,524,491 B1 | 2/2003 | Liu et al. | 216/22 |
| 7,245,454 B2 | 7/2007 | Aoki et al. | 360/126 |
| 7,253,992 B2 | 8/2007 | Chen et al. | 360/126 |
| 7,343,664 B2 | 3/2008 | Khera et al. | 29/603.12 |
| 2006/0232883 A1 | 10/2006 | Biskeborn et al. | 360/129 |
| 2009/0273859 A1 * | 11/2009 | Flint et al. | 360/235.4 |

* cited by examiner

*Primary Examiner*—Rodney G McDonald
(74) *Attorney, Agent, or Firm*—Zilka-Kotab, PC (57) ABSTRACT

A method according to one embodiment includes ion milling at a first angle of greater than about 25 degrees from normal relative to a media facing side of a thin film region of a magnetic head or component thereof for recessing the thin film region at about a constant rate for films of interest of the thin film region, planes of deposition of the films being oriented about perpendicular to the media facing side; and ion milling or plasma sputtering at a second angle of less than about 25 degrees from normal relative to the media facing side of the thin film region for recessing magnetic films therein faster than insulating films therein, the second angle being smaller than the first angle.

19 Claims, 6 Drawing Sheets

METHODS OF ION MILLING FOR MAGNETIC HEADS AND SYSTEMS FORMED THEREBY

BACKGROUND

The present invention relates to magnetic recording heads, and more particularly, this invention relates to ion milling for magnetic recording heads.

In magnetic storage systems, data is read from and written onto magnetic recording media utilizing magnetic transducers commonly. Data is written onto the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. This movement generally entrains a film of air between the head and tape. Usually the tape head is designed for minimizing the spacing between the head and the tape. The spacing between the magnetic head and the magnetic tape is crucial so that the recording gaps of the write transducers, which are the source of the magnetic recording flux, ideally contact the tape to effect efficient signal transfer, and so that the read elements ideally contact the tape to provide effective coupling of the magnetic field from the tape to the read element.

One particular problem which may be encountered when tape is moved over the surface of the tape recording head is the tape induced bridging of metallic portions of the thin films across the top portions of the films. As a result, thin films which are to be insulated from each other may actually come into electrical contact with each other, which in time may result in shorting and failure of the head. This effect can be seen in FIG. 2D, and will be explained in more detail later. Therefore, it would be favorable to have a technique of selectively altering the surface heights of thin films, allowing an insulator to have a higher surface height than surrounding poles or shields, to minimize this bridging effect.

Additionally, the thin entire film region may be recessed from the surrounding components, such as the substrate and closure, so that the tape will rarely come into contact with the head components in the thin film region. One method to recess the thin film region is plasma etching, such as argon plasma etching. However, as is well known, an argon plasma etches nickel iron alloys and some other metals commonly used in magnetic heads much more rapidly than the surrounding insulators. Thus, while plasma etching may produce an overall recession for all materials in the gap, the amount of etching required to produce the desired overall recession may produce excessive magnetic pole, sensor, and shield recession, and thus lead to excessive spacing loss.

What is needed is a method to produce overall recession without excessive metal recession.

SUMMARY

A method according to one embodiment includes ion milling at a first angle of greater than about 25 degrees from normal relative to a media facing side of a thin film region of a magnetic head or component thereof for recessing the thin film region at about a constant rate for films of interest of the thin film region, planes of deposition of the films being oriented about perpendicular to the media facing side; and ion milling or plasma sputtering at a second angle of less than about 25 degrees from normal relative to the media facing side of the thin film region for recessing magnetic films therein faster than insulating films therein, the second angle being smaller than the first angle.

A method according to another embodiment includes ion milling at a first angle of between about 25 degrees and about 70 degrees from normal relative to a media facing side of a thin film region of a magnetic head or component thereof positioned between a substrate and a closure for recessing the thin film region at about a constant rate for all films of the thin film region, planes of deposition of the films being oriented about perpendicular to the media facing side; and ion milling or plasma sputtering at a second angle of between about 0 and about 25 degrees from normal relative to the media facing side of the thin film region for recessing magnetic films therein faster than insulating films therein.

A structure according to one embodiment includes a substrate having a media facing side; and a thin film stack formed on the substrate, the thin film stack including magnetic films and insulating films, wherein the thin film stack is recessed from a plane extending along the media facing side of the substrate, wherein the magnetic films are recessed more than the insulating films, wherein the magnetic films each have a substantially flat media facing surface, wherein the insulating films each have a substantially flat media facing surface.

Any of these embodiments may be implemented in a magnetic data storage system such as a tape drive system, which may include a magnetic head as recited above, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

A method according to one general embodiment includes ion milling at a first angle of greater than about 25 degrees from normal relative to a media facing side of a thin film region of a magnetic head or component thereof for recessing the thin film region at about a constant rate for films of interest of the thin film region, planes of deposition of the films being oriented about perpendicular to the media facing side; and ion milling or plasma sputtering at a second angle of less than about 25 degrees from normal relative to the media facing side of the thin film region for recessing magnetic films therein faster than insulating films therein, the second angle being smaller than the first angle.

A method according to another general embodiment includes ion milling at a first angle of between about 25 degrees and about 70 degrees from normal relative to a media facing side of a thin film region of a magnetic head or component thereof positioned between a substrate and a closure for recessing the thin film region at about a constant rate for all films of the thin film region, planes of deposition of the films being oriented about perpendicular to the media facing side; and ion milling or plasma sputtering at a second angle of between about 0 and about 25 degrees from normal relative to the media facing side of the thin film region for recessing magnetic films therein faster than insulating films therein.

A structure according to one general embodiment includes a substrate having a media facing side; and a thin film stack formed on the substrate, the thin film stack including magnetic films and insulating films, wherein the thin film stack is recessed from a plane extending along the media facing side of the substrate, wherein the magnetic films are recessed more than the insulating films, wherein the magnetic films each have a substantially flat media facing surface, wherein the insulating films each have a substantially flat media facing surface.

Figure 1:
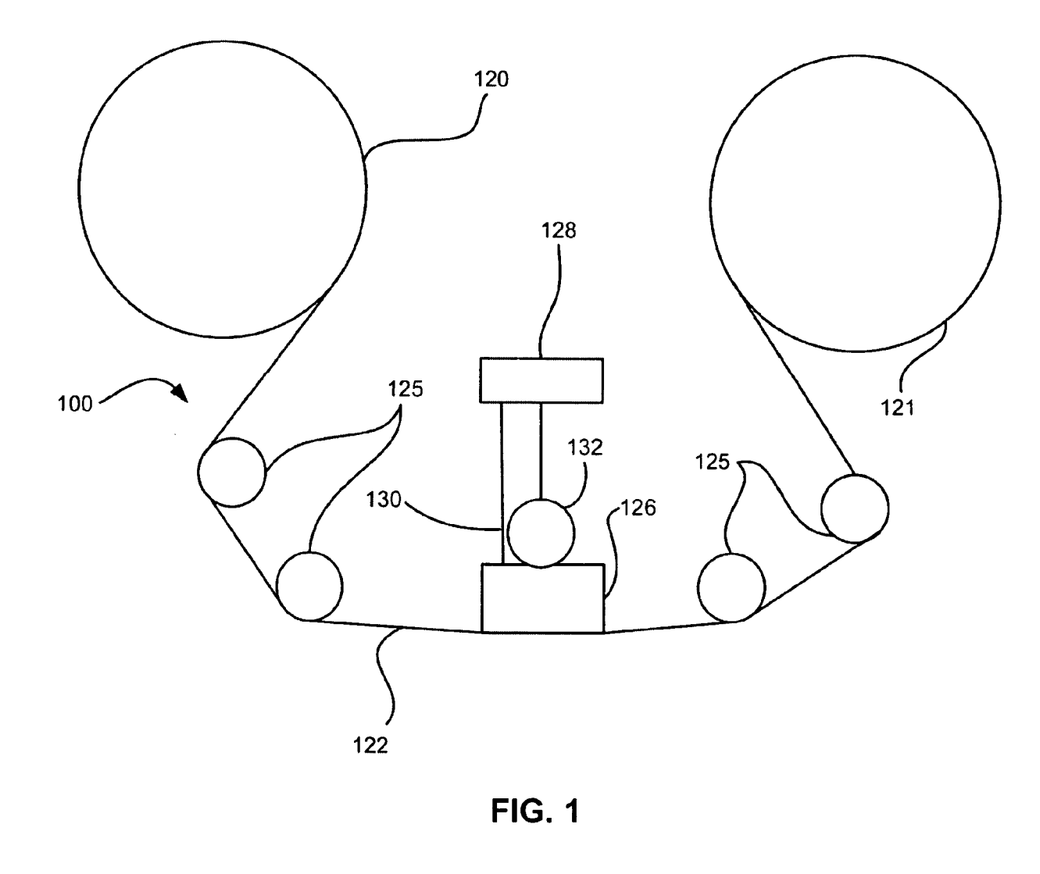
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
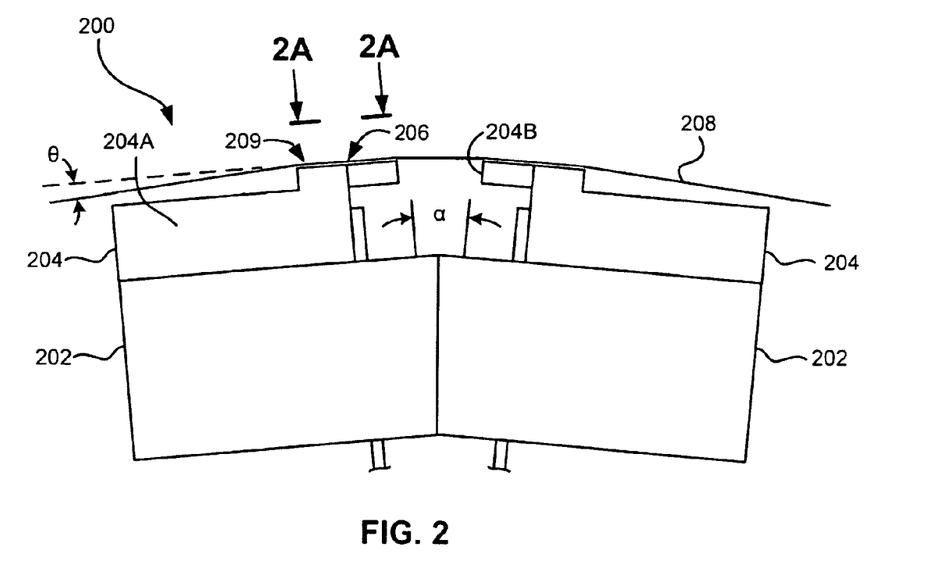
FIG. 2 illustrates a side view of a flat-lapped, bi-directional, two-module magnetic tape head according to one embodiment.

By way of example, FIG. 2 illustrates a side view of a flat-lapped, bidirectional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a gap 206 comprising readers and/or writers situated therebetween. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers.

Figure 2A:
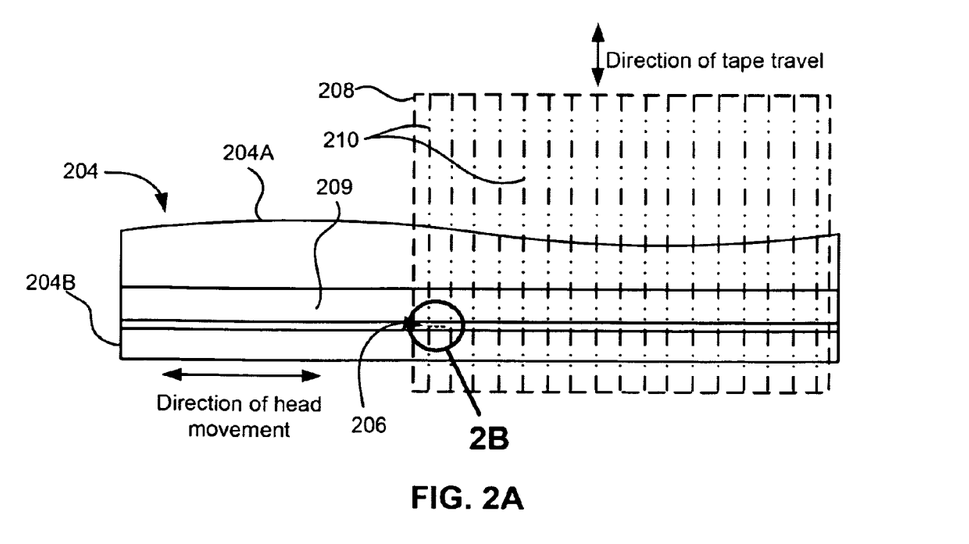
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4-22 data bands, e.g., with 16 data bands and 17 servo tracks 210, as shown in FIG. 2A on a one-half inch wide tape 208. The data bands are defined between servo tracks 210. Each data band may include a number of data tracks, for example 96 data tracks (not shown). During read/write operations, the elements 206 are positioned within one of the data bands. Outer readers, sometimes called servo readers, read the servo tracks 210. The servo signals are in turn used to keep the elements 206 aligned with a particular track during the read/write operations.

Figure 2B:
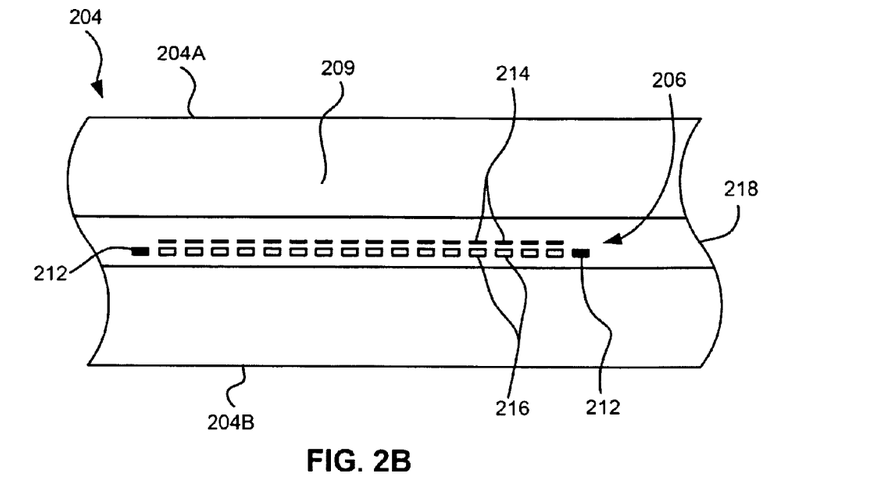
FIG. 2B is a detailed view taken from Circle 2B of FIG. 2A.

FIG. 2B depicts a plurality of read and/or write elements 206 formed in a gap 218 on the module 204 in Circle 2B of FIG. 2A. As shown, the array of elements 206 includes, for example, 16 writers 214, 16 readers 216 and two servo readers 212, though the number of elements may vary. Illustrative embodiments include 8, 16, 32, and 64 elements per array 206. A preferred embodiment includes 32 readers per array and/or 32 writers per array. This allows the tape to travel more slowly, thereby reducing speed-induced tracking and mechanical difficulties. While the readers and writers may be arranged in a piggyback configuration as shown in FIG. 2B, the readers 216 and writers 214 may also be arranged in an interleaved configuration. Alternatively, each array of elements 206 may be readers or writers only, and the arrays may contain one or more servo readers 212. As noted by considering FIGS. 2 and 2A-B together, each module 204 may include a complementary set of elements 206 for such things as bidirectional reading and writing, read-while-write capability, backward compatibility, etc.

Figure 2C:
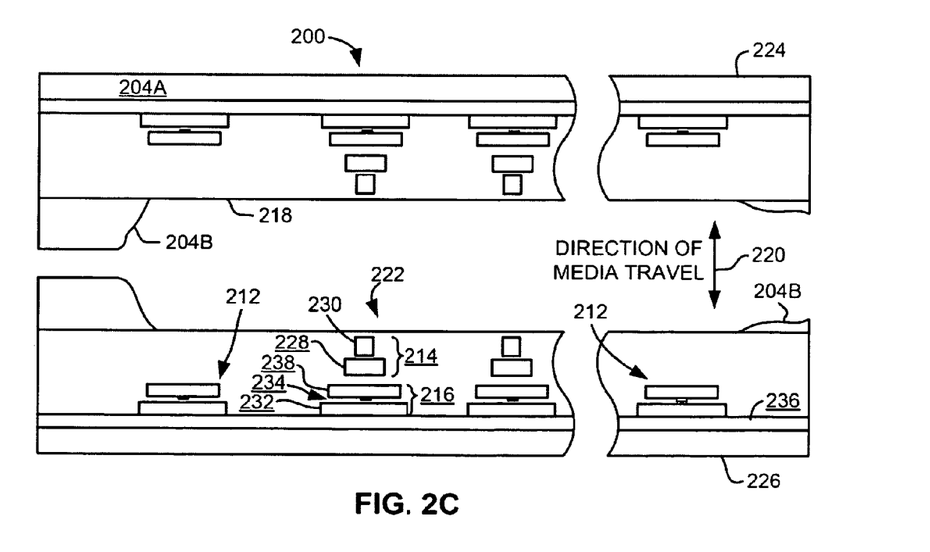
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in forward and reverse directions as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 2D:
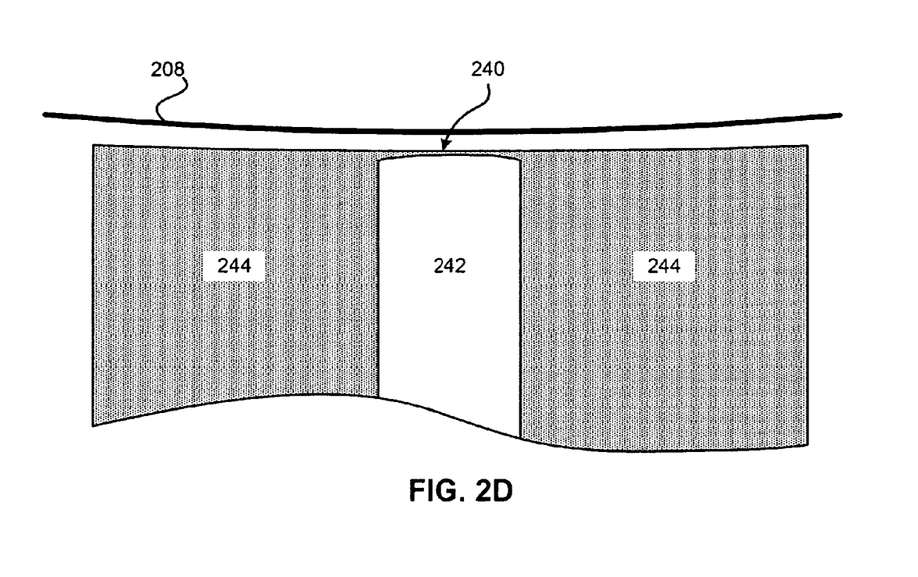
FIG. 2D is a schematic diagram of the bridging effect that can occur to magnetic heads.

Now referring to FIG. 2D, a common problem associated with magnetic read heads is bridging where portions of materials form surface bridges between the read sensor films and the shields. In FIG. 2D, this effect is shown in relation to either poles or shields 244, which are typically separated by an insulator 242 of some type. Motion of the tape 208 across the surface of the head may assist in formation of conductive bridges, and if enough material bridges across the surface of the insulator 242, an electrical connection 240 may form between the read sensor and the shields 244, which can result in shorting and head failure, rendering the device inoperable. In order to correct this problem, it is generally preferable to have the shields or poles 244 recessed to a height less than the insulators 242, thereby rendering it less likely for material to form an electrical connection 240 across the insulators 242.

Bridging may involve, for example, migration of metallic films on the head surface or may involve more complex processes such as electrochemical formation or media deposition or interactions.

Figure 2E:
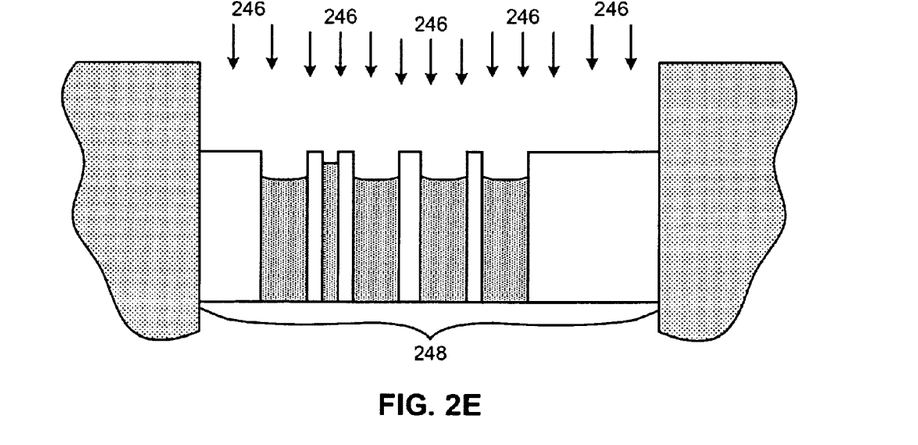
FIG. 2E is a schematic diagram showing an overetching effect that can result from plasma etching on thin film regions.

Referring to FIG. 2E, a method for minimizing the bridging effect is to recess the entire thin film region 248 of a magnetic head through plasma etching 246. However, argon plasma etching 246 may be overly selective of the poles and shield portions of the thin film region 248, resulting in a loss of signal amplitude, symmetry, or resolution. To overcome this problem, a more uniform etching or milling method is needed for producing a recessed thin film region 248 without overetching the pies and shields.

Figure 3A:
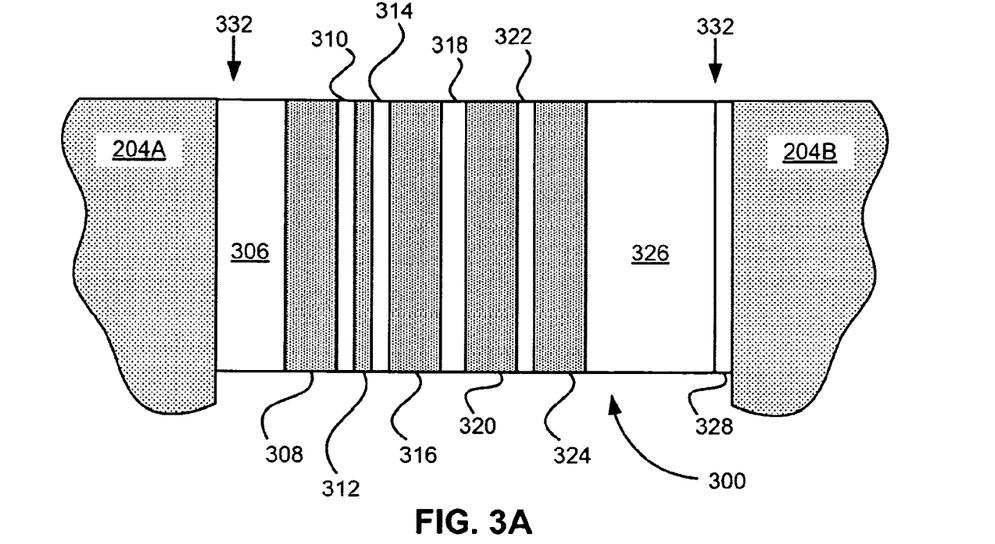
FIG. 3A is a schematic diagram of ion milling at a first angle on a thin film region according to one embodiment.

Now referring to FIGS. 3A-3D, a method according to one embodiment is shown. In FIG. 3A, a substrate 204A and a closure 204B may form portions of an air bearing surface (ABS) or a tape bearing surface (TBS), and may further define a thin film region 300 which may include multiple thin films which may reside in a gap, such as gap 206 shown in FIG. 2B. For illustrative purposes, several of these thin films are identified in FIGS. 3A-3D and the thin films are shown in relation to a gap between a substrate 204A and a closure 204B. Moving from the substrate 204A toward the closure 204B, a first thin film may be the undercoat insulation 306, then a first shield 308 which should be insulated from a sensor structure 312 by any number of thin films 310, 314, including at least one insulator. Next, an insulator 318 may separate the second shield 316 from a first pole 320. Next, another insulator 322, often forming the write transducer gap, may separate the first pole 320 from a second pole 324 in the gap region. An overcoat insulator 326 may be next, followed by a bondline 328 near the closure 204B. There may also be other thin films and the overall design and ordering of these thin films is for illustrative purposes only, and in no way should limit the invention, nor should the inclusion of the substrate 204A and closure 204B in this description.

Figure 3B:
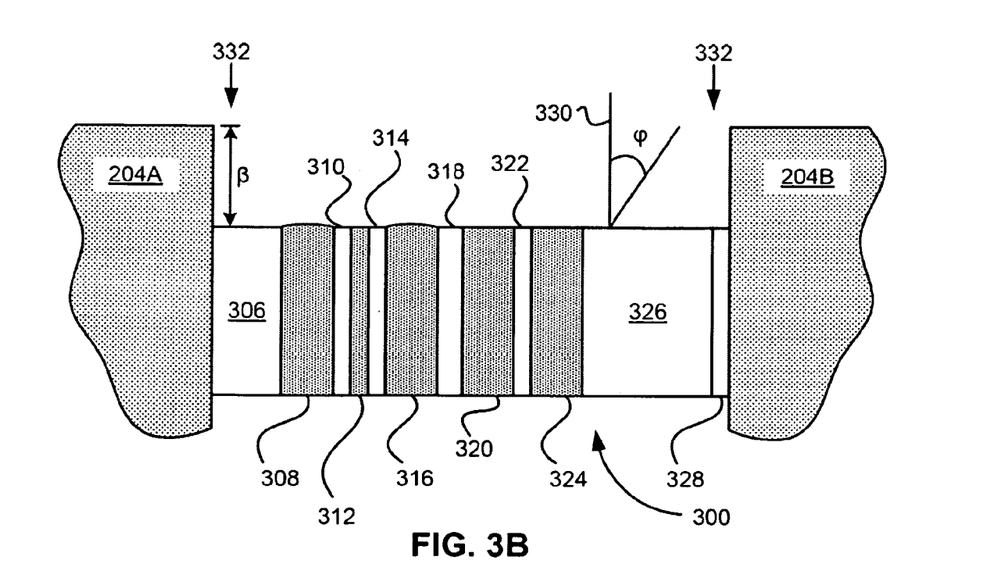
FIG. 3B is a schematic diagram of ion milling at a second angle on a thin film region according to one embodiment.

Referring to FIG. 3B, a method, according to one embodiment, comprises ion milling the structure shown in FIG. 3A at a first angle φ of greater than about 25° from normal 330 relative to a media facing side 332, sometimes referred to as the air bearing surface (ABS) or tape bearing surface (TBS), of a thin film region 300 of a magnetic head or component thereof for recessing the thin film region 300 at about a constant rate for the films of interest (e.g., the magnetic and transducing films (including films that may be both magnetic and transducing) such as the write poles 320, 324 and magnetic and possibly other portions of the sensor 312; the shields 308, 316; and insulating layers adjacent to the magnetic and transducing films) of the thin film region 300, planes of deposition of the films being oriented about perpendicular to the media facing side 332. Note that some films may etch at a different rate than the films of interest. For example, the leads (not shown) tend to etch more slowly than other layers when milled at the first angle. Note also that the structure being milled is typically rotated relative to the ion source, or vice versa, during the milling.

The methodology described herein may also be applied to heads having films at an angle of less than 90° to the tape bearing surface.

In particularly preferred embodiments, the first angle φ may be greater than about 50°, between about 50° and about 70°, ideally about 60°. Ion milling at about 60° is relatively non-selective, and thus most gap materials tend to etch at approximately the same rate.

With continued reference to FIG. 3B, the result of ion milling at the first angle φ according to one embodiment is shown, as the thin film region 300 has been recessed from the media facing side 332 by a distance β. The distance β may be adjusted depending on the particular effect desired by the method. Note that some of the metallic layers, e.g., the first shield 308, portions of the read sensor 312, second shield 316, first pole 320, and/or second pole 324 may protrude slightly from the overall plane of the media facing surface.

Figure 3C:
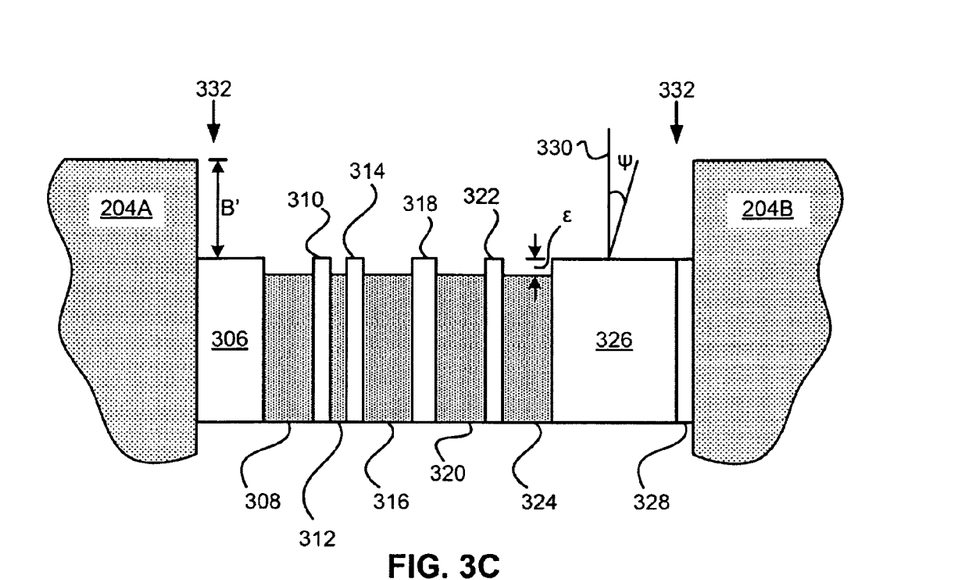
FIG. 3C is a schematic diagram of the result of ion milling at a first and second angle on a thin film region according to one embodiment.

Referring to FIG. 3C, the method may further comprise ion milling or plasma sputtering at a second angle ψ of less than about 25° (and preferably greater than 0°) from normal 330 relative to the media facing side 332 of the thin film region 300 for recessing magnetic films, such as iron-containing films, and potentially other metallic alloy-containing films, therein faster than insulating films therein. For example, this ion milling at a second angle ψ could be used to recess the first shield 308, read sensor 312, second shield 316, first pole 320, and/or second pole 324 faster than the insulating layers (e.g., 318, 322, etc.) therebetween are recessed.

In other embodiments, the second angle ψ may be between about 0° and about 25°, preferably about 5° to about 15°, ideally about 15°.

With continued reference to FIG. 3C, the result of ion milling at the second angle ψ according to one embodiment is shown, as the magnetic films have been recessed by a distance ε more than the insulating layers. The distance ε may be adjusted depending on the desired effect of the method. The magnetic films were recessed faster than the insulating films, resulting in more material being removed in the same amount of exposure time to the ion milling. By leaving the insulating films exposed above the upper surface of the magentic films, conductive bridging between the films should be substantially reduced or eliminated since the insulating layers should make it more difficult for material from recessed films to form electrical connections between the recessed films.

Figure 3D:
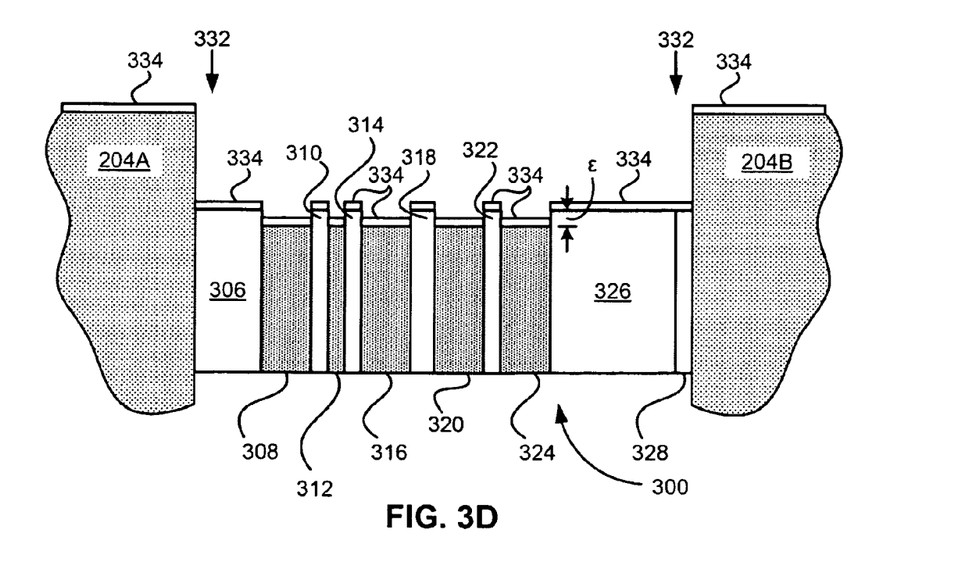
FIG. 3D is a schematic diagram of a thin film region after ion milling at a first and second angle including a protective coating according to one embodiment.

Now referring to FIG. 3D, an optional step according to one embodiment is shown, where a protective coating 334 may be formed above the media facing side 332 of the thin film region 300. This protective coating 334 may also be applied to the media facing side 332 of the substrate 204A and closure 204B. In addition, this protective coating 334 above the thin film region 300 may not be so thick as to extend to a plane extending along a media facing side 332 of a substrate on which the films are formed, as shown in FIG. 3D. In another approach, this protective coating 334 may extend to a plane extending along a media facing side 332 of a substrate on which the films are formed. For example, the depth of the protective coating 334 may be such that the coating fills the distance between the upper surface of the thin film region 300 and the upper surface of the substrate 204A and closure 204B, or to an additional height as determined by the protective coating 334 thickness on the upper surface of the substrate 204A and closure 204B.

In other embodiments, at least some of the metallic films may form write poles or reader shields or both write poles and reader shields.

In one embodiment, the ion milling at the first angle φ may be performed before the ion milling and/or sputtering at the second angle ψ. Further, the ion milling and/or sputtering may be continuously performed as the ion milling angle is transitioned from the first angle φ to the second angle ψ.

In another embodiment, the ion milling and/or sputtering at the second angle ψ may be performed before the ion milling at the first angle φ. Further, the ion milling and/or sputtering may be continuously performed as the ion milling angle is transitioned from the second angle ψ to the first angle φ.

Moreover, a combination of the foregoing continuous milling and/or sputtering may be performed such that the milling and/or sputtering is performed in both forward and backward angular directions. Further, continuous loops of milling between the first and second angles may be performed, thereby milling or sputtering continuously and repeatedly, back and forth, between the first and second angles.

In other approaches, the milling or sputtering is preformed in alternating fashion in the first and second angles. The number of repetitions, and the processing time at each angle can be selected to achieve the desired profile.

In further approaches, milling and/or sputtering may be performed at additional angles, e.g., a third angle between the first and second angles.

In various approaches, the target may be stationary, rotating, or a combination of both.

Keeping in mind that definitions from above may apply to the descriptions below, and with continued reference to FIGS. 3A-3D, another method, according to one embodiment, comprises ion milling at a first angle φ of between about 50° and about 70° from normal 330 relative to a media facing side 332 of a thin film region 300 of a magnetic head or component thereof positioned between a substrate 204A and a closure 204B for recessing the thin film region 300 at about a constant rate for the films of interest of the thin film region 300, planes of deposition of the films being oriented about perpendicular to the media facing side 332; and ion milling at a second angle ψ of between about 0° and about 25° from normal 330 relative to the media facing side 332 of the thin film region 300 for recessing metallic films (e.g., 308, 316, 320, etc.) therein faster than insulating films (e.g., 306, 318, 326, etc.) therein.

With reference to FIG. 3D, a structure, according to one embodiment, may comprise a substrate 204A having a media facing side 332 (which is sometimes called an ABS or TBS); and a thin film stack 300 formed on the substrate 204A, the thin film stack 300 including magnetic and other alloy-containing films (e.g., 308, 316, 320, etc.) and insulating films (e.g., 306, 318, 326, etc.), wherein the thin film stack 300 is recessed from a plane extending along the media facing side 332 of the substrate 204A (e.g., by a distance β'), wherein the magentic films are recessed more than the insulating films (e.g., by a distance ε), wherein the magnetic films each have a substantially flat media facing surface, wherein the insulating films each have a substantially flat media facing surface.

In one embodiment, milling atoms are not embedded in the magnetic or transducing films other than those present immediately after formation of the thin film stack 300, as well as possible oxidation or corrosion products.

It will be clear that the various features of the foregoing methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
ion milling at a first angle of greater than about 25 degrees from normal relative to a media facing side of a thin film region of a magnetic head or component thereof for recessing the thin film region at about a constant rate for films of interest of the thin film region, planes of deposition of the films being oriented about perpendicular to the media facing side; and ion milling or plasma sputtering at a second angle of less than about 25 degrees from normal relative to the media facing side of the thin film region for recessing magnetic films therein faster than insulating films therein, the second angle being smaller than the first angle, wherein the magnetic films are recessed more than the insulating films after the ion milling and/or plasma sputtering steps are completed.

2. The method of claim 1, wherein the thin films reside in a gap between a substrate and a closure, the substrate and closure forming portions of a tape bearing surface.

3. The method of claim 1, wherein the first angle is between about 50 degrees and about 70 degrees.

4. The method of claim 1, wherein the second angle is between about 0 degrees and about 25 degrees.

5. The method of claim 1, wherein at least some of the magnetic films form write poles.

6. The method of claim 1, wherein at least some of the magnetic films form reader shields.

7. The method of claim 1, wherein the milling or sputtering is performed continuously and repeatedly in both directions between the first and second angles.

8. The method of claim 1, wherein the milling or sputtering is performed in alternating fashion in the first and second angles.

9. The method of claim 1, wherein the milling at the first angle is performed before the milling or sputtering at the second angle.

10. The method of claim 9, wherein the milling or sputtering is continuously performed during a transition from the first angle to the second angle.

11. The method of claim 1, wherein the milling or sputtering at the second angle is performed before the milling at the first angle.

12. The method of claim 11, wherein the milling or sputtering is continuously performed during a transition from the second angle to the first angle.

13. The method of claim 1, further comprising adding a protective coating to the media facing side of the thin film region.

14. The method of claim 13, wherein the protective coating above the thin film region does not extend to a plane extending along a media facing side of a substrate on which the films are formed.

15. The method of claim 13, wherein the protective coating above the thin film region extends to a plane extending along a media facing side of a substrate on which the films are formed.

16. A method, comprising:

ion milling at a first angle of between about 25 degrees and about 70 degrees from normal relative to a media facing side of a thin film region of a magnetic head or component thereof positioned between a substrate and a closure for recessing the thin film region at about a constant rate for all films of the thin film region, planes of deposition of the films being oriented about perpendicular to the media facing side, wherein the substrate and closure form portions of a tape bearing surface; and ion milling or plasma sputtering at a second angle of between about 0 and about 25 degrees from normal relative to the media facing side of the thin film region for recessing magnetic films therein faster than insulating films therein.

17. The method of claim 16, wherein the magnetic films are recessed more than the insulating films after the ion milling and/or plasma sputtering steps are completed.

18. The method of claim 16, further comprising adding a protective coating to the media lacing side of the thin film region.

19. The method of claim 18, wherein the protective coating above the thin film region does not extend to a plane extending along a media facing side of a substrate on which the films are formed.

* * * * *